United States Patent
Sanocki

(10) Patent No.: US 9,406,161 B1
(45) Date of Patent: Aug. 2, 2016

(54) CURVE REPARAMETERIZATION

(75) Inventor: Tom Sanocki, Berkeley, CA (US)

(73) Assignee: PIXAR, Emeryville, CA (US)

( * ) Notice: Subject to any disclaimer, the term of this patent is extended or adjusted under 35 U.S.C. 154(b) by 593 days.

(21) Appl. No.: 12/827,004

(22) Filed: Jun. 30, 2010

Related U.S. Application Data

(60) Provisional application No. 61/222,971, filed on Jul. 3, 2009.

(51) Int. Cl.
| | |
|---|---|
| *G06T 13/00* | (2011.01) |
| *G06T 17/00* | (2006.01) |
| *G06T 15/00* | (2011.01) |
| *G09G 5/00* | (2006.01) |
| *G06T 13/40* | (2011.01) |
| *G06T 17/20* | (2006.01) |

(52) U.S. Cl.
CPC ............ *G06T 13/40* (2013.01); *G06T 17/20* (2013.01)

(58) Field of Classification Search
CPC ......... G09G 5/14; G06T 15/30; G06T 11/203
USPC ............... 345/629, 606, 467–469, 473–474
See application file for complete search history.

(56) References Cited

U.S. PATENT DOCUMENTS

| | | | |
|---|---|---|---|
| 4,821,214 A | 4/1989 | Sederberg | |
| 8,102,403 B1 * | 1/2012 | DeRose et al. | 345/606 |
| 2010/0259546 A1 * | 10/2010 | Yomdin et al. | 345/473 |
| 2012/0075340 A1 * | 3/2012 | DeRose et al. | 345/629 |

* cited by examiner

*Primary Examiner* — Jin-Cheng Wang

(74) *Attorney, Agent, or Firm* — Kilpatrick Townsend & Stockton LLP

(57) ABSTRACT

In various embodiments, one or more control structures having sufficient detail or resolution to generate complex deformations of a computer generated model can be bound to the model. These control structures can be bound to the model in a fixed reference pose and used as intermediate control structures for controlling a variety of deformations. In one aspect, to facilitate articulation of all or a portion of the model, a set of one or more intermediate control structures may be reparameterized using one or more additional control structures. An additional control structure can be bound to an intermediate control structure dynamically at pose time. An additional control structure bound to an intermediate control structure may include only enough detail or resolution required for specific subsets of the deformations that may be produced by the intermediate controls structure.

24 Claims, 8 Drawing Sheets

CURVE REPARAMETERIZATION

CROSS-REFERENCES TO RELATED APPLICATIONS

This Application claims the benefit of and priority to U.S. Provisional Patent Application No. 61/222,971, filed Jul. 3, 2009 and entitled "Curve Reparameterization," which is hereby incorporated by reference for all purposes.

BACKGROUND

This disclosure relates to computer-generated imagery (CGI) and computer-aided animation. More specifically, this disclosure relates to techniques for using several sets of control structures in CGI and computer-aided animation.

With the wide-spread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, crate lighting, coloring and paint, or the like, of characters or other elements of a computer animation display.

Pixar is one of the pioneering companies in the computer-generated imagery (CGI) and computer-aided animation industry. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006), "Ratatouille" (2007), and others. In addition to creating animated features, Pixar develops computing platforms and tools specially designed for computer-aided animation and CGI. One such example is now known as PhotoRealistic RenderMan, or PRMan for short. PRMan is a photorealistic RenderMan-compliant rendering software system based on the RenderMan Interface Specification (RISpec) which is Pixar's technical specification for a standard communications protocol (or interface) between 3D computer graphics programs and rendering programs. PRMan is produced by Pixar and used to render their in-house 3D animated movie productions. It is also available as a commercial product licensed to third parties, sold as part of a bundle called RenderMan Pro Server, a RenderMan-compliant rendering software system developed by Pixar based on their own interface specification. Other examples include tools and plug-ins for programs such as the AUTODESK MAYA high-end 3D computer graphics software package from AutoDesk, Inc. of San Rafael, Calif.

One core functional aspect of PRMan can include the use of a "rendering engine" to convert geometric and/or mathematical descriptions of objects into images. This process is known in the industry as "rendering." For movies, other animated features, shorts, and special effects, a user (e.g., a skilled computer graphics artist) can specify the geometric or mathematical description of objects to be used in the rendered image or animation sequence, such as characters, props, background, or the like. In some instances, the geometric description of the objects may include a number of animation control variables (avars) and values for the avars. An animator may also pose the objects within the image or sequence and specify motions and positions of the objects over time to create an animation.

As such, the production of CGI and computer-aided animation may involve the extensive use of various computer graphics techniques to produce a visually appealing image from the geometric description of an object that may be used to convey an essential element of a story or provide a desired special effect. One of the challenges in creating these visually appealing images can be the balancing of a desire for a highly-detailed image of a character or other object with the practical issues involved in allocating the resources (both human and computational) required to produce those visually appealing images.

Accordingly, what is desired is to solve one or more problems that may be discussed herein relating to manipulating objects for use in CGI and computer-aided animation. Additionally, what is desired is to reduce some of drawbacks that may be discussed herein relating to manipulating objects for use in CGI and computer-aided animation.

BRIEF SUMMARY OF THE DISCLOSURE

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be present some innovations, embodiments, and/or examples found within this disclosure in a simplified form as a prelude to a more detailed description presented later.

In various embodiments, one or more control structures having sufficient detail or resolution to generate complex deformations of a computer generated model can be bound to the model. These control structures can be bound to the model in a fixed reference pose and used as intermediate control structures for controlling a variety of deformations. Such control structures may include high-resolution deformers in the form or curves, surfaces, volumes, or the like, that have a static binding with the model. In one aspect, to facilitate articulation of all or a portion of the model, a set of one or more intermediate control structures may be reparameterized using one or more additional control structures. An additional control structure can be bound to an intermediate control structure dynamically at pose time. An additional control structure bound to an intermediate control structure may include only enough detail or resolution required for specific subsets of the deformations that may be produced by the intermediate controls structure.

Accordingly, in one embodiment, a method for creating poses of computer-generated models includes receiving a first object bound to a second object. The first object can be bound in a fixed reference pose to the second object. A third object can then be bound to the first object. The third object may be bound in a selected pose to the first object. Information specifying one or more manipulations of the third object can be provided, such as through the manipulation of controls or animation variables associated with the third object. One or more resulting deformations of the second object can then be generated based on the one or more manipulations of the third object and the first object.

In some embodiments, a plurality of objects may be provided that are bound to the first object and includes the third object. Each object in the plurality objects may be bound in a plurality of selected poses to the first object. An animator or other user may freely select between the plurality of objects to produce a variety of deformations. In further embodiments, one object may be bound to the first object in a first selected pose. The object may have a first resolution that is different from a second resolution of another object that may also be bound to the first object in a second selected pose. In still further embodiments, one object may be bound to the first object and have a first resolution that is different from a second resolution of the first object.

In various embodiments, one object may be bound to the first object in a first selected pose configured to influence the first object by a first predetermined amount. Another object may be bound to the first object in a second selected pose configured to influence the first object by a second predetermined amount different from the first predetermined amount. In yet another embodiment, a graphical user interface may be generated that is configured to display a visual representation of the first object, a visual representation of the second object, and a visual representation of each object in a plurality of objects that include the third object. Selections of the third object via the graphical user interface may be made from the plurality of objects. Input provided via the graphical user interface may further be indicative of one or more manipulations of the third object.

In yet another aspect, receiving the first object bound to the second object may include receiving one or more of a line object, surface object, or volume object. Receiving a plurality of third objects bound to the first object may include receiving at least one of a lattice object, a line object, surface object, or volume object.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF EXEMPLARY EMBODIMENTS

Figure 1:
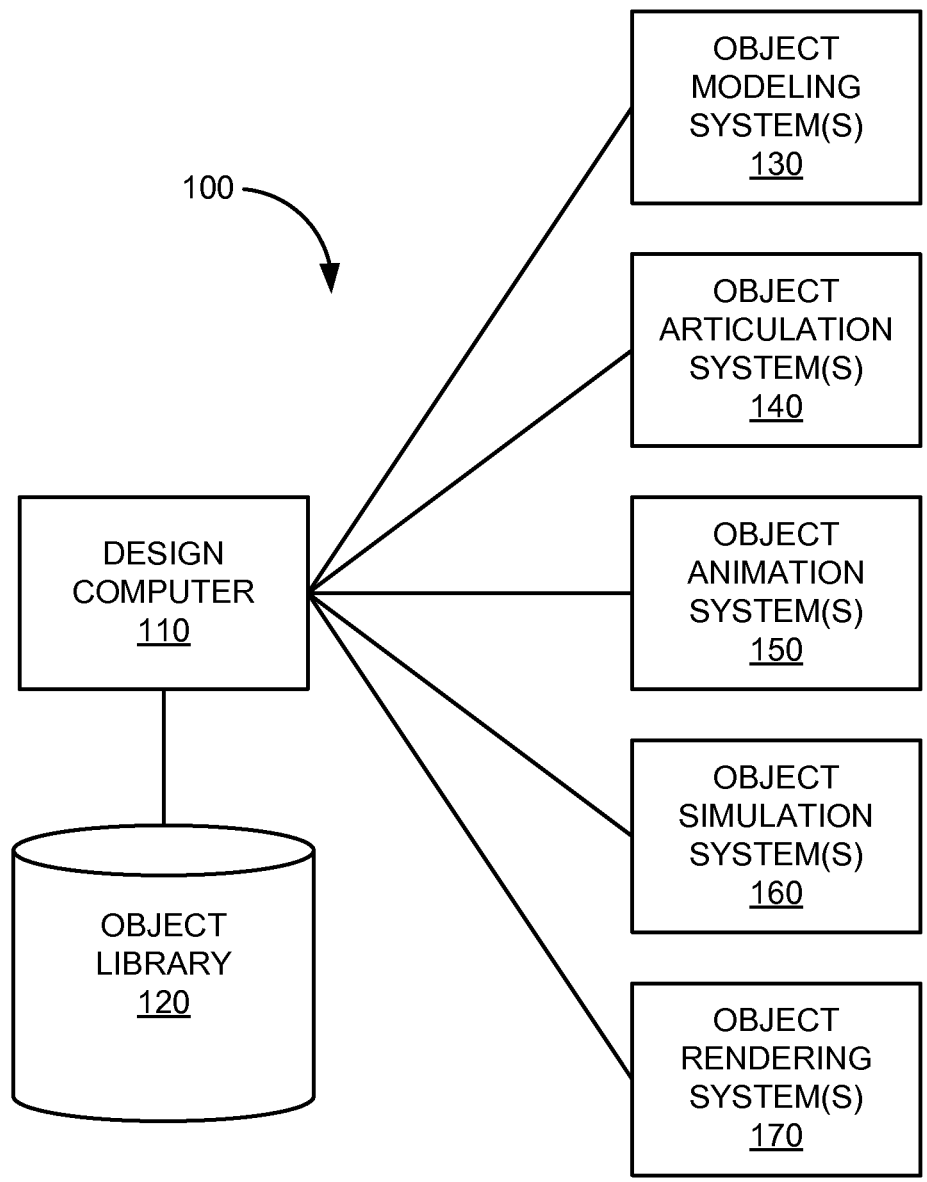
FIG. 1 is a simplified block diagram of a system for creating computer graphics imagery (CGI) and computer-aided animation that may implement or incorporate various embodiments or techniques for curve reparameterization.

FIG. 1 is a simplified block diagram of system 100 for creating computer graphics imagery (CGI) and computer-aided animation that may implement or incorporate various embodiments or techniques for using intermediary dynamically-bound object to control static-bound objects. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through nonclear atmosphere or air; shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency, diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), nonphotorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for facilitating the articulation of computer-generated models.

In various embodiments, for example, one or more control structures having sufficient detail or resolution to generate complex deformations of a computer generated model can be bound to the model. These control structures can be bound to the model in a fixed reference pose and used as intermediate control structures. Such control structures include high-resolution deformers in the form or curves, surfaces, volumes, or the like, that have a static binding with the model. To facilitate articulation of all or a portion of the model, these intermediate control structures may be reparameterized using one or more additional control structures. An additional control structure can be bound to an intermediate control structure dynamically at pose time. An additional control structure bound to an intermediate control structure may include only enough detail or resolution required for specific subsets of the deformations that may be produced by the intermediate controls structure. Users of design computer 110 may be given the option of selecting one or more additional control structures to manipulate.

Figure 2:
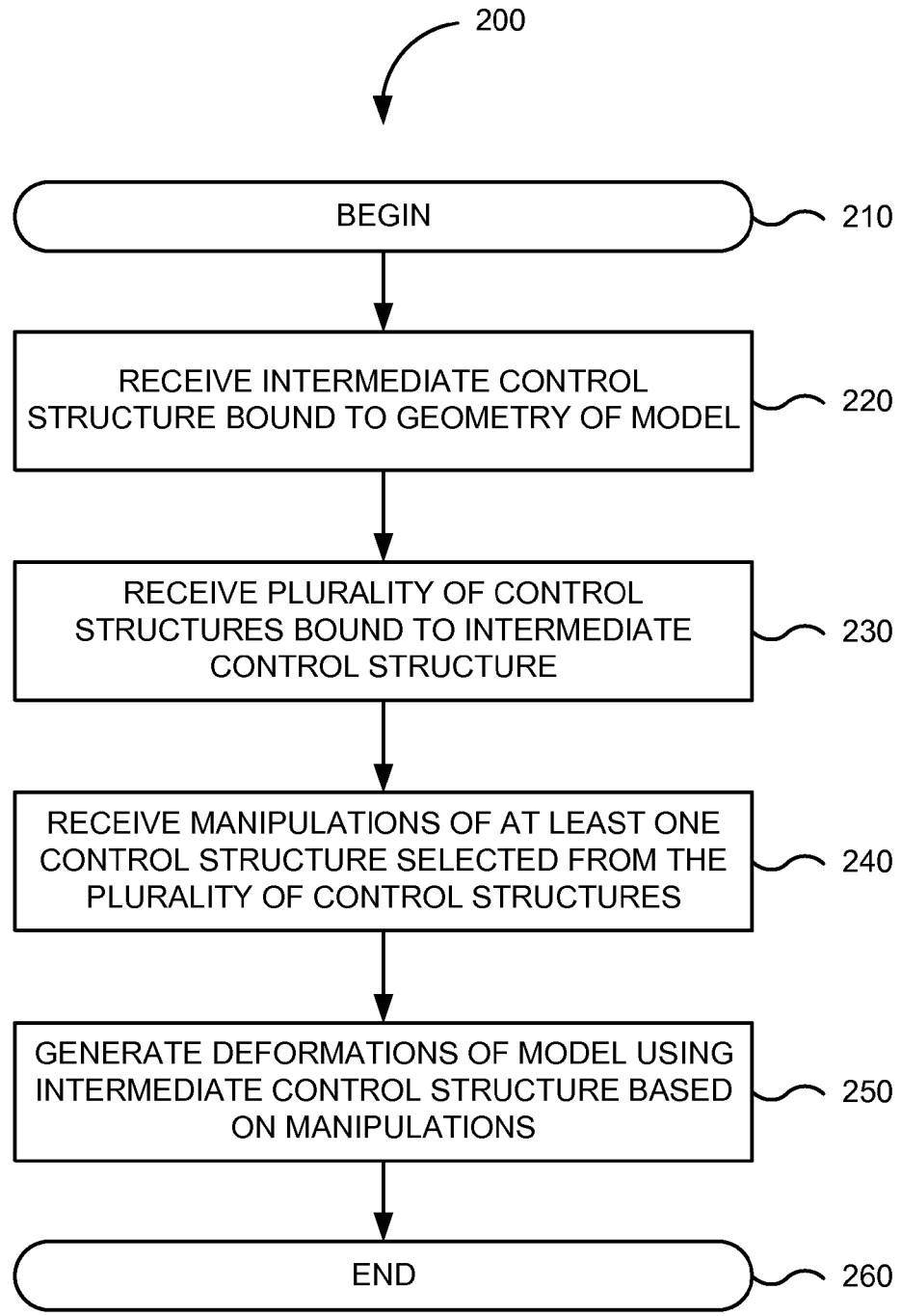
FIG. 2 is a flowchart of a method for creating poses of computer-generated models according to one embodiment.

FIG. 2 is a flowchart of method 200 for creating poses of computer-generated models according to one embodiment. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, a control structure bound to geometry of a model is received. In various embodiments, the control structure may be referred to as an intermediate control structure. The control structure can be configured to influence all or a portion of another object, such as the geometry of a computer-generated model. In general, a control structure can include one or more objects. An object may represent one or more lines, curves, surfaces, volumes, or the like. Some control structures may take the form of cages, meshes, lattices, or other arrangements of lines, curves, surfaces, volumes, or the like. A control structure may include one or more control points or avars. These control points or avars may be placed at vertices of a control structure or at other predetermined points on or in the shape of a control structure.

A number of control points or avars may be placed based on geometric complexity of the control structure, a corresponding object, or specificity of detail for which it is desired to manipulate portions of control structure or corresponding object. Manipulation of one or more of these control points or avars can produce a change in the shape of the control structure. One or more changes in the shape of the control structure may then produce one or more changes in an associated object, such as in the geometry of a computer-generated model. These control points or avars may be manipulated to influence one or more deformers configured to generate one or more deformations in the geometry of a computer-generated model.

Figure 3:
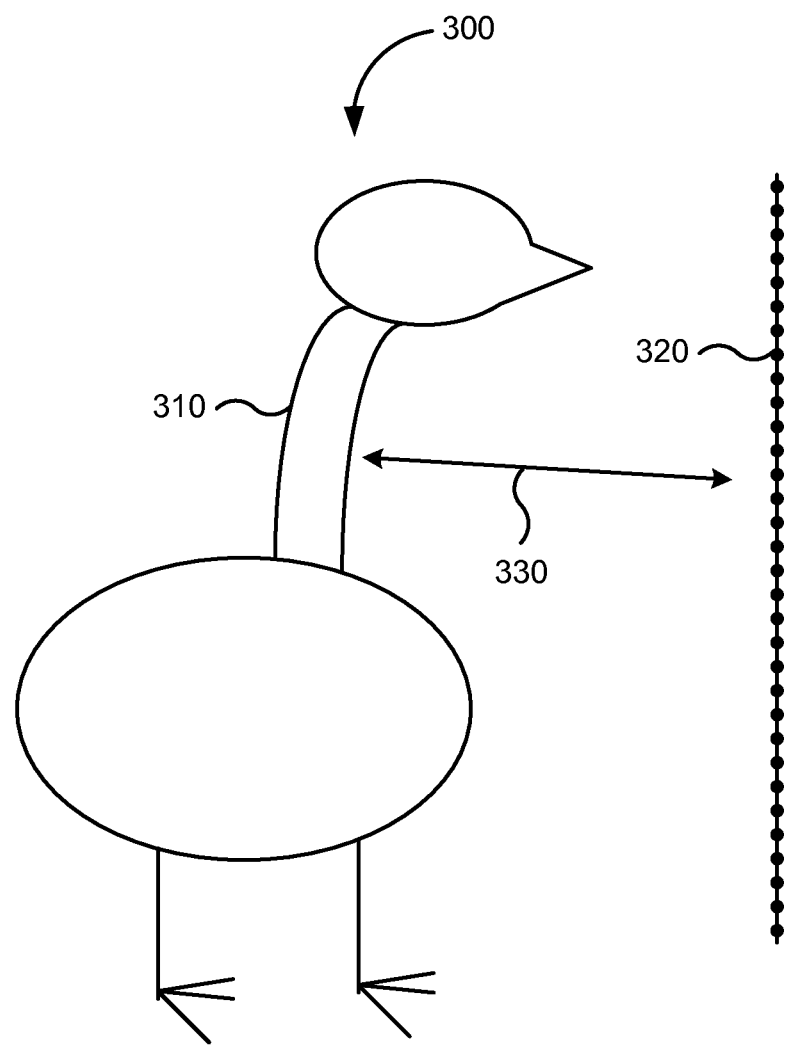
FIG. 3 is an illustration of a computer-generated model with at least one control structure according to one embodiment.

FIG. 3 is an illustration of computer-generated model 300 with at least one control structure according to one embodiment. In this example, model 300 takes the form of a bird and includes a neck portion 310. A user of design computer 110, for example, may create or designate a set of control points or avars that enable an animator to control deformations of neck portion 310. These control points or avars may be represented in FIG. 3 by solid black dots positioned along control structure 320. Although control structure 320 of FIG. 3 is pictured as a straight line, control structure 320 may be represented by a curve, surface, volume, or any other 2D or 3D objects, such as curve deformers, cages, lattices, or the like.

Control structure 320 is "bound" to neck portion 310 of model 300 using binding 330. Binding 330 can include one or more mappings between points or portions of control structure 320 and points or portions of neck portion 310 or projections of points or portions of control structure 320 onto points or portions of neck portion 310. In one aspect, each and every control point or avar associated with control structure 320 can have a certain weight by which it influences a corresponding point or portion of neck portion 310. Calculation of these weights can be a time-consuming process. Therefore, they may be computed once during initialization or loading of model 300 and stored for subsequent use. Binding 330 may include a static fixed reference pose, such as a rest-binding.

Returning to FIG. 2, in step 230, a plurality of control structures bound to the intermediate control structure is received. In various embodiments, each control structure in the plurality of control structures can be configured to influence all or a portion of another object, such as the shape of the intermediate control structure. In general, each control structure in the plurality of control structures can include one or more objects. Each control structure in the plurality of control structures may be represented by one or more lines, curves, surfaces, volumes, or the like. Each control structure in the plurality of control structures may take the form of cages, meshes, lattices, or other arrangements of lines, curves, surfaces, volumes, or the like. Each control structure in the plurality of control structures may include one or more control points or avars. These control points or avars may be placed at vertices of a control structure or at other predetermined points on or in the shape of a control structure.

A number of control points or avars may be placed based on geometric complexity of the control structure, a corresponding object, or specificity of detail for which it is desired to manipulate portions of control structure or corresponding object. Manipulation of one or more of these control points or avars can produce a change in the shape of the control structure. One or more changes in the shape of the control structure may then produce one or more changes in an associated object, such as in the shape of the intermediate control structure.

Figure 4A:
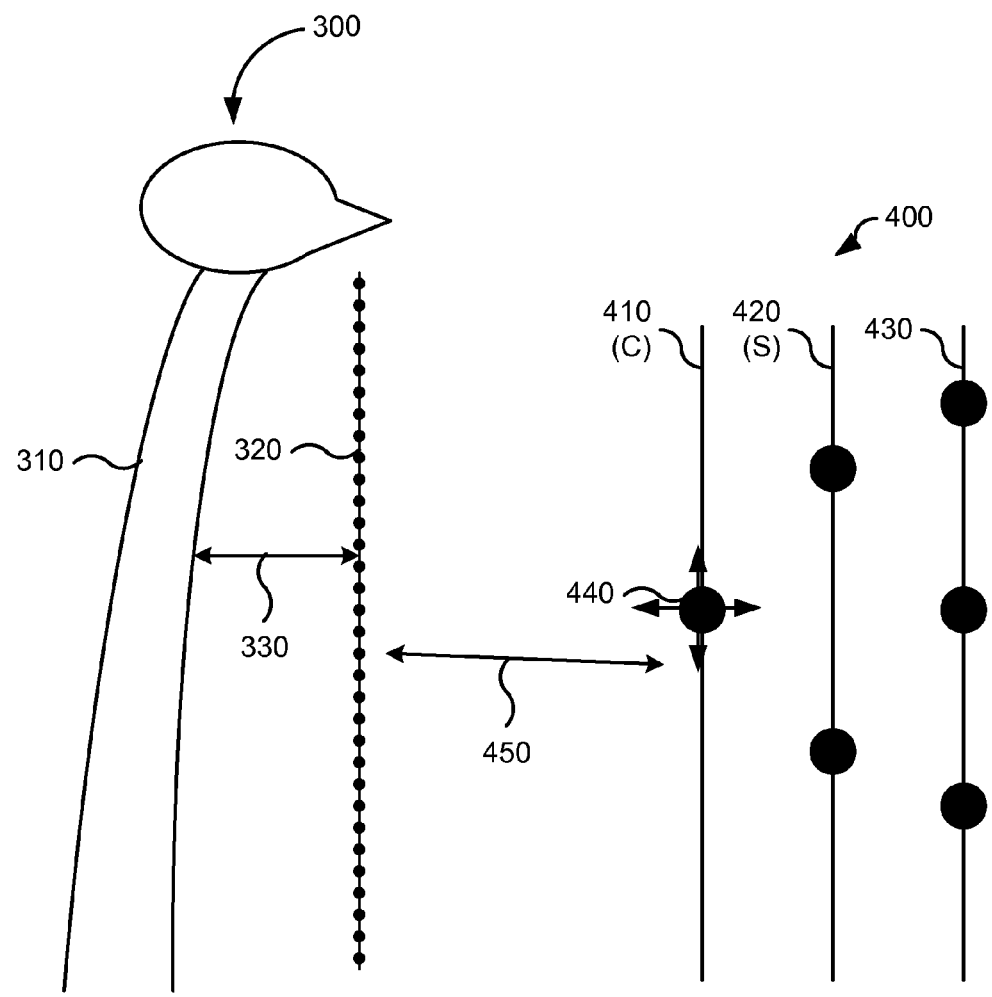
FIG. 4A is an illustration of the computer-generated model of FIG. 3 having a variety of control structures bound to the at least one control structure of FIG. 3 according to one embodiment.

FIG. 4A is an illustration of computer-generated model 300 of FIG. 3 having a variety of control structures 400 bound to intermediate control structure 320 according to one embodiment. In this example, model 300 is provided with a plurality of control structures 400, each being different by definition. Each control structure in the plurality of control structures 400 may include one or more control points or avars represented in FIG. 4 by solid black dots positioned along the control structure.

In various embodiments, control structures 400 can include control structure 410 for influencing deformations of neck portion 310 in a general or substantial C shape, control structure 420 for influencing deformations of neck portion 310 in a general or substantial S shape, and control structure 430 for influencing deformations of neck portion 310 in a more specific or detailed S shapes. Control structure 410 may include at least one control points or avars (e.g., control point 440) whose manipulations influence control structure 320 into generating deformations of neck portion 410 in a general or substantial C shape. Control structures 420 can include at least two control points or avars whose manipulations influence control structure 320 into generating deformations of neck portion 310 in a general or substantial S shape. Control structure 430 can include at least three control points or avars whose manipulations influence control structure 320 into generating generally more detailed S shapes.

In some embodiments, each control structure in control structures 400 may be visually represented based on specific deformations that may occur through manipulations of a predetermined number of control points or avars associated with the control structure. Accordingly, a user of design computer 110 may select one of several control structures each providing a specific defined variation of deformations capable using control structure 320.

Each control structure in control structures 400 is "bound" to control structure 320, e.g., using binding 450. Binding 450, for example, can include one or more mappings between points or portions of control structure 410, 420, and/or 430 and points or portions of control structure 320. In one aspect, each and every control point or avar associated with control structure 410, 420, and/or 430 can have a certain weight by which it influences a corresponding point or portion of control structure 320.

As discussed above, in various embodiments, each control structure in control structures 400 may define or otherwise provide a subset of deformations to neck portion 310 that may be made using control structure 320. Therefore, the number of control points or avars of control structures 410, 420, and/or 430 that need to be bound to control structure 320 can be substantially less than the number of control points or avars of control structure 320 that needed to be bound to neck portion 310. Additionally, control points or avars of control structures 410, 420, and/or 430 may not be designed to influence all of neck portion 310, and therefore some of the control points or avars of control structure 320 may remain unbound or uninfluenced. Thus, calculation of the weight by which a control point or avar of control structures 410, 420, and/or 430 influences a portion of control structure 320 can be performed dynamically at pose time. In some embodiments, binding 450 can be computed each time control points or avars associated with one or more of control structures 400 are changed. Accordingly, in various embodiments, system 100 provides fast and stable deformations of model 300 when a majority of points of model 300 in neck portion 310 are to remain unposed through the use of one or more of control structures 400. A new pose-based binding 450 may be computed resulting from manipulations of control points or avars associated with one or more of control structures 400. Therefore, a dynamic projection may be computed each time control points or avars associated with control structures 400 are changed.

Returning again to FIG. 2, in step 240, manipulations are received of at least one control structure selected from the plurality of control structures bound to the intermediate control structure. For example, control point 440 may be manipulated in one or more degrees of freedom to influence all or a portion of control structure 320 to deform neck portion 310 in a general or substantial C shape. In step 250, deformations of the model are generated using the intermediate control structure based on the manipulations of at least one control structure selected from the plurality of control structures. Method 200 of FIG. 2 ends in step 260.

Figure 4B:
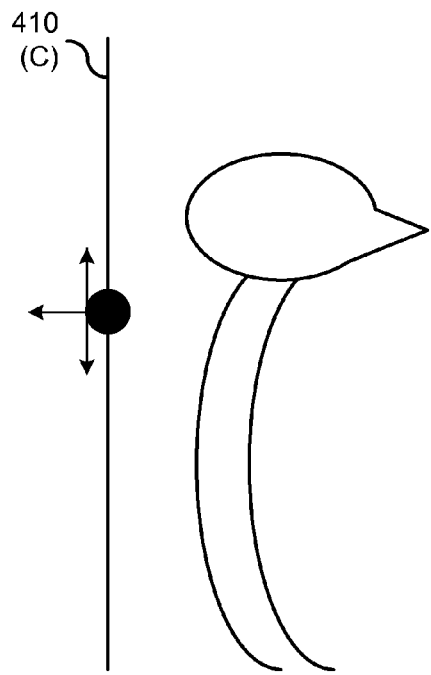
FIGS. 4B-4D are illustrations of deformations of the computer-generated model of FIG. 3 resulting from manipulations of one or more of the control structures of FIG. 4A according to various embodiments.
Figure 4C:
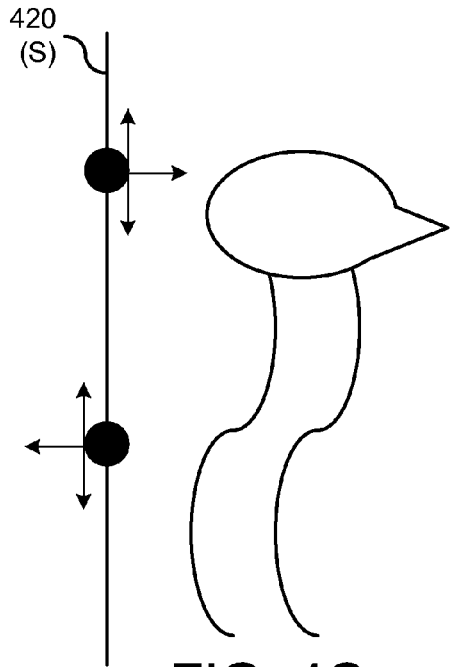
Figure 4D:
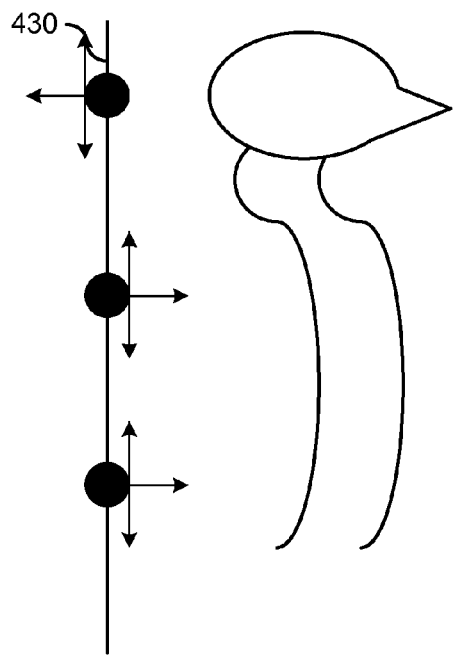

FIGS. 4B-4D are illustrations of deformations of computer-generated model 300 of FIG. 3 resulting from manipulations of one or more of control structures 400 of FIG. 4A according to various embodiments. In FIG. 4B, control structure 410 can be configured to more readily create deformations in general or substantial C shapes of neck portion 310 of model 300 with at least one control point. A user may manipulate the at least one control point to position the control point along an axis of control structure 410 to specify a relative focal point representing where the furthest extension of a curve or arc of a C shape is located. A user then may manipulate the at least one control point in one or more directions to specify the extent of the C shape.

In FIG. 4C, control structure 420 can be configured to more readily create deformations in general or substantial S shapes of neck portion 310 of model 300 with at least two control points. A user may manipulate one or more of the at least two control points to position the control points along an axis of control structure 420 to specify a relative focal point representing where the furthest extension of each curve or arc of an S shape is located. A user then may manipulate one or more of the at least two control points in one or more directions to specify the extent of the S shape.

In FIG. 4D, control structure 430 can be configured to more readily create deformations in more detailed S shapes of neck portion 310 of model 300 with at least three control points. A user may manipulate one or more of the at least three control points to position the control points along an axis of control structure 430 to specify a relative focal point representing where the furthest extension of each curve or arc of an S shape is located. A user then may manipulate one or more of the at least three control points in one or more directions to specify the extent of the S shape.

Figure 5A:
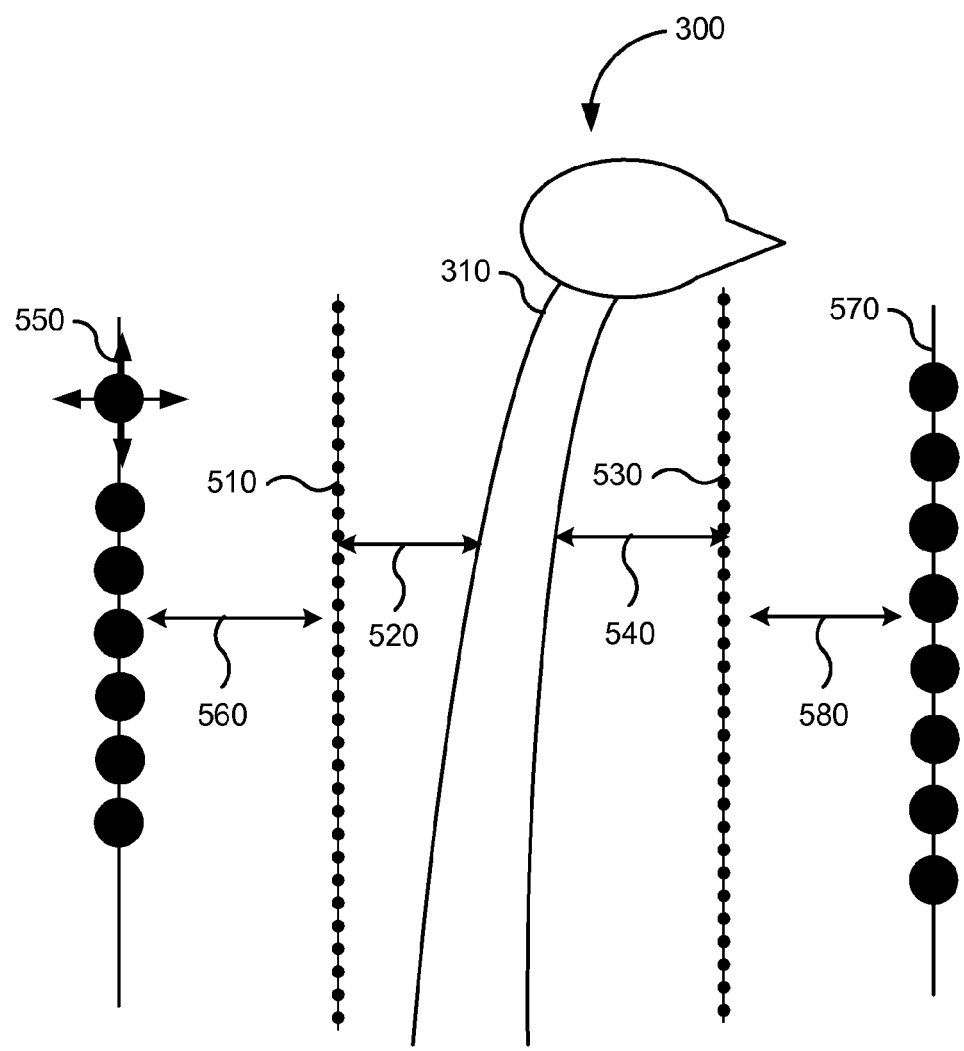
FIG. 5A is another illustration of the computer-generated model of FIG. 3 having control structures bound to intermediate control structures according to one embodiment.

FIG. 5A is another illustration of the computer-generated model of FIG. 3 having a variety of control structures bound to intermediate control structures according to one embodiment. In this example, intermediate control structure 510 is bound to a portion of neck portion 310 of model 300 using fixed-reference binding 520. Intermediate control structure 510 includes a substantial number of control points or avars (represented by small black dots) based on the detail for which it is desired to manipulate the corresponding portion of neck portion 310. Fixed-reference binding 520 is statically determined at bind time and does not change at pose time. Intermediate control structure 530 is bound to a portion of neck portion 310 of model 300 substantially opposite the portion associated with intermediate control structure 510 using fixed-reference binding 540. Intermediate control structure 520 includes a substantial number of control points or avars (represented by small black dots) based on the detail for which it is desired to manipulate the corresponding portion of neck portion 310. Fixed-reference binding 540 is statically determined at bind time and does not change at pose time.

In one example of operation, an animator may control deformations of neck portion 310 of model 300 using the control points or avars associated with intermediate control structures 510 and 530. Intermediate control structure 510 may be placed or otherwise oriented to the left of neck portion 310 to visually represent that intermediate control structure 510 drives deformations of the left half of neck portion 310. Intermediate control structure 530 may be placed or otherwise oriented to the right of neck portion 310 to visually represent that intermediate control structure 530 drives deformations of the right half of neck portion 310.

In various embodiments, control structure 550 is bound to all or a portion of intermediate control structure 510 using a desired binding 560. Control structure 510 includes a reduced number of control points or avars (represented by larger black dots) than intermediate control structure 510 based on the detail for which it is desired to manipulate intermediate control structure 510 to achieve a particular effect or specific deformation. Desired binding 520 is dynamically determined at pose time and may change throughout the posing process. Control structure 570 is bound to all or a portion intermediate control structure 530 using a desired binding 580. Control structure 570 includes a number of control points or avars (represented by larger black dots) than intermediate control structure 530 based on the detail for which it is desired to manipulate intermediate control structure 530 to achieve a particular effect or specific deformation. Desired binding 580 is dynamically determined at pose time and may change throughout the posing process.

Figure 5B:
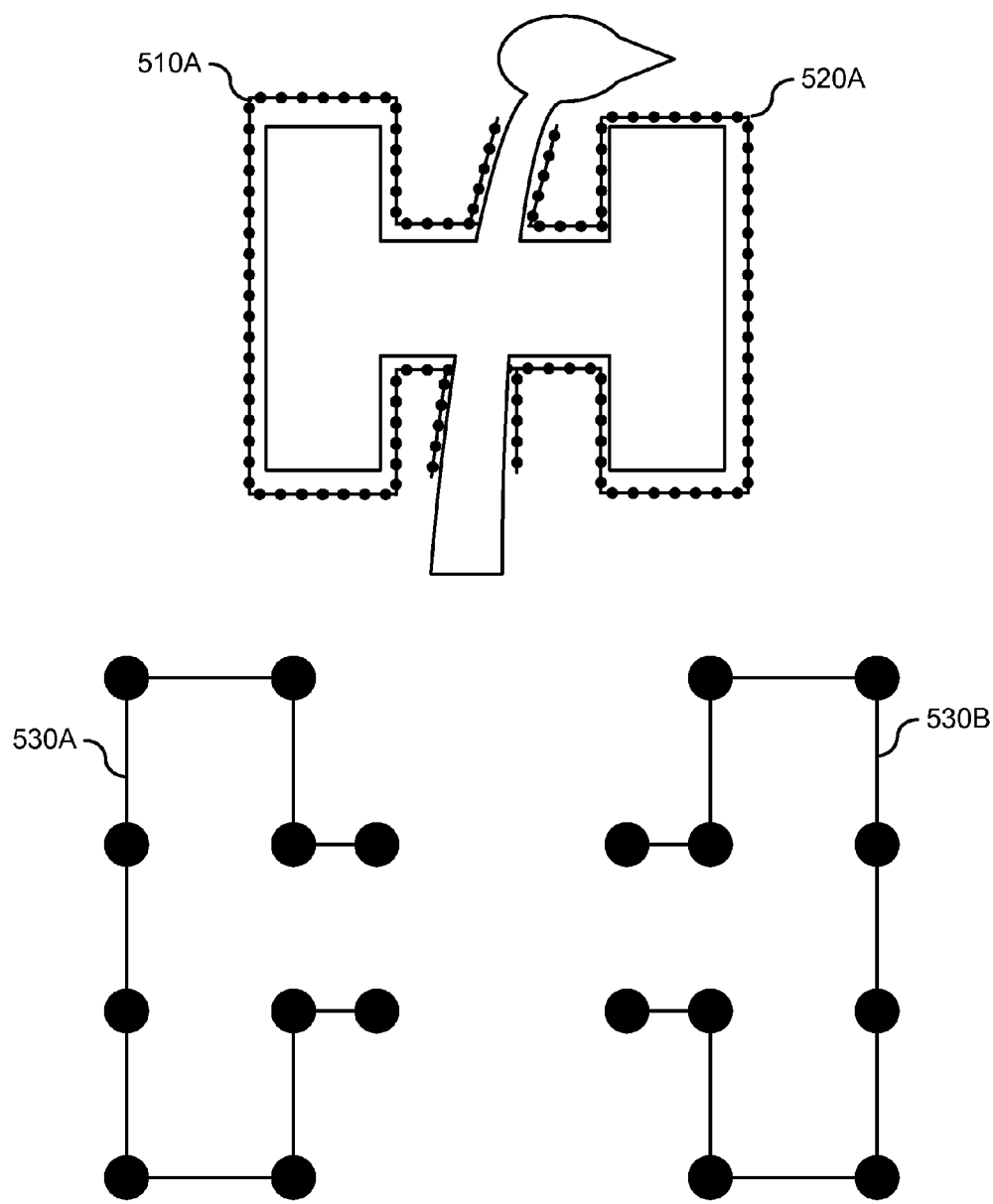
FIG. 5B is an illustration of a deformation of the computer-generated model of FIG. 3 resulting from manipulations of the control structures of FIG. 5A according to various embodiments.

FIG. 5B is an illustration of a deformation of computer-generated model 300 of FIG. 3 resulting from manipulations of control structures 550 and 570 of FIG. 5A according to various embodiments. In this example, control structures 550 and 570 may be provided with enough detail to manipulate intermediate control structures 510 and 530 to achieve specific deformations of neck portion 310 to give the appearance that model 300 has swallowed an item and has the item lodged in its throat. Deformations may be generated that appear to be triangular items, square shaped items, T shaped items, H shape items, or the like.

Figure 6:
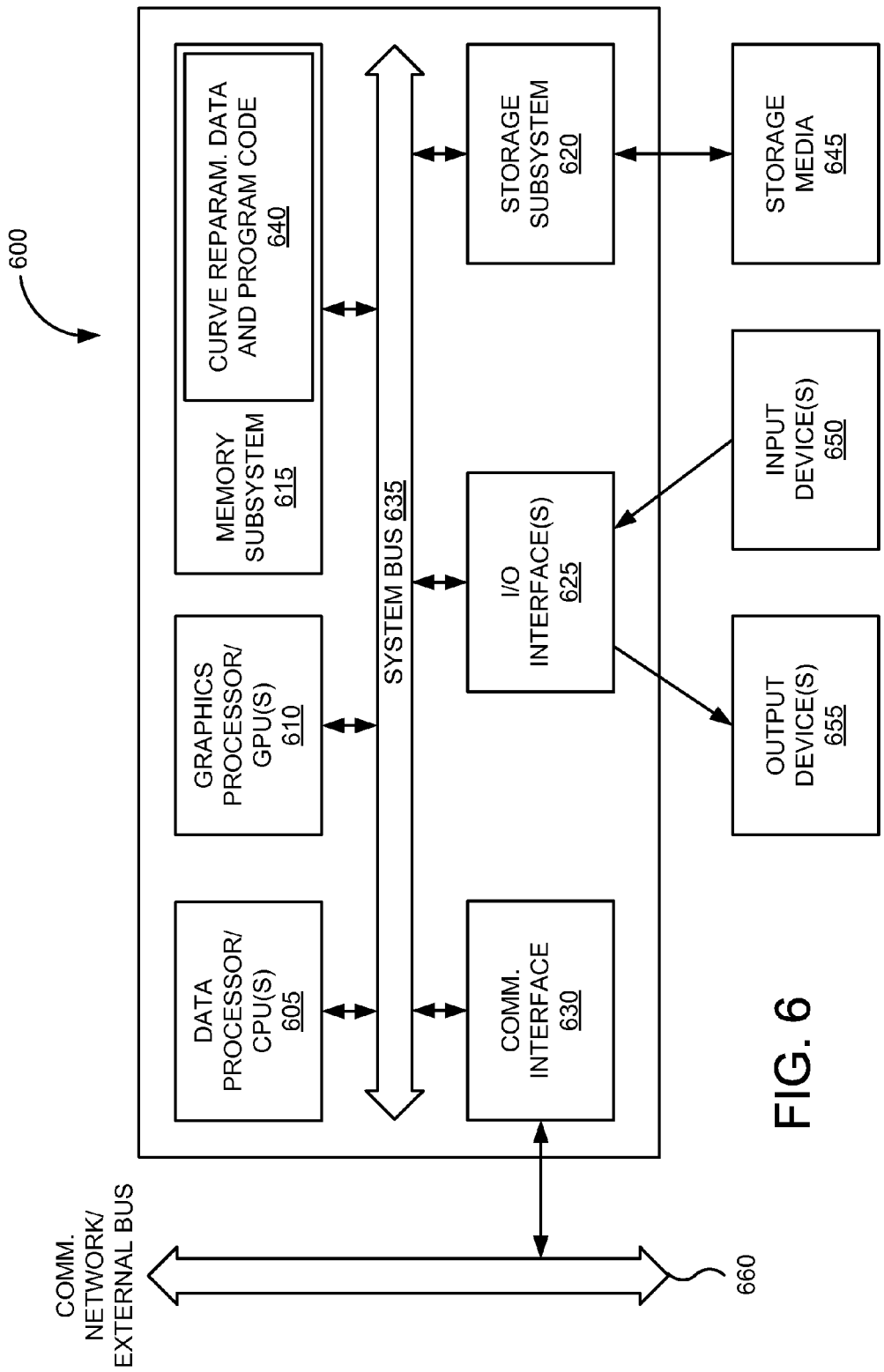
FIG. 6 is a block diagram of a computer system or information processing device that may incorporate an embodiment, be incorporated into an embodiment, or be used to practice any of the innovations, embodiments, and/or examples found within this disclosure.

FIG. 6 is a block diagram of computer system 600 that may incorporate an embodiment, be incorporated into an embodiment, or be used to practice any of the innovations, embodiments, and/or examples found within this disclosure. FIG. 6 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 600 can include hardware and/or software elements configured for performing logic operations and calculations, input/output operations, machine communications, or the like. Computer system 600 may include familiar computer components, such as one or more one or more data processors or central processing units (CPUs) 605, one or more graphics processors or graphical processing units (GPUs) 610, memory subsystem 615, storage subsystem 620, one or more input/output (I/O) interfaces 625, communications interface 630, or the like. Computer system 600 can include system bus 635 interconnecting the above components and providing functionality, such connectivity and inter-device communication. Computer system 600 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 605 can include hardware and/or software elements configured for executing logic or program code or for providing application-specific functionality. Some examples of CPU(s) 605 can include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. CPU(s) 605 may also include one or more field-gate programmable arrays (FPGAs), application-specific integrated circuits (ASICs), or other microcontrollers. The one or more data processors or central processing units (CPUs) 605 may include any number of registers, logic units, arithmetic units, caches, memory interfaces, or the like. The one or more data processors or central processing units (CPUs) 605 may further be integrated, irremovably or moveably, into one or more motherboards or daughter boards.

The one or more graphics processor or graphical processing units (GPUs) 610 can include hardware and/or software elements configured for executing logic or program code associated with graphics or for providing graphics-specific functionality. GPUs 610 may include any conventional graphics processing unit, such as those provided by conventional video cards. Some examples of GPUs are commercially available from NVIDIA, ATI, and other vendors. In various embodiments, GPUs 610 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 610 may include any number of registers, logic units, arithmetic units, caches, memory interfaces, or the like. The one or more data processors or central processing units (CPUs) 605 may further be integrated, irremovably or moveably, into one or more motherboards or daughter boards that include dedicated video memories, frame buffers, or the like.

Memory subsystem 615 can include hardware and/or software elements configured for storing information. Memory subsystem 615 may store information using machine-readable articles, information storage devices, or computer-readable storage media. Some examples of these articles used by memory subsystem 670 can include random access memories (RAM), read-only-memories (ROMS), volatile memories, nonvolatile memories, and other semiconductor memories. In various embodiments, memory subsystem 615 can include curve reparameterization data and program code 640.

Storage subsystem 620 can include hardware and/or software elements configured for storing information. Storage subsystem 620 may store information using machine-readable articles, information storage devices, or computer-readable storage media. Storage subsystem 620 may store information using storage media 645. Some examples of storage media 645 used by storage subsystem 620 can include floppy disks, hard disks, optical storage media such as CD-ROMS, DVDs and bar codes, removable storage devices, networked storage devices, or the like. In some embodiments, all or part of curve reparameterization data and program code 640 may be stored using storage subsystem 620.

In various embodiments, computer system 600 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system. Computer system 600 may also include one or more applications configured to executed, perform, or otherwise implement techniques disclosed herein. These applications may be embodied as curve reparameterization data and program code 640. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 615 and/or storage subsystem 620.

The one or more input/output (I/O) interfaces 625 can include hardware and/or software elements configured for performing I/O operations. One or more input devices 650 and/or one or more output devices 655 may be communicatively coupled to the one or more I/O interfaces 625.

The one or more input devices 650 can include hardware and/or software elements configured for receiving information from one or more sources for computer system 600. Some examples of the one or more input devices 650 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 650 may allow a user of computer system 600 to interact with one or more nongraphical or graphical user interfaces to enter a comment, select objects, icons, text, user interface widgets, or other user interface elements that appear on a monitor/display device via a command, a click of a button, or the like.

The one or more output devices 655 can include hardware and/or software elements configured for outputting information to one or more destinations for computer system 600. Some examples of the one or more output devices 655 can include a printer, a fax, a feedback device for a mouse or joystick, external storage systems, a monitor or other display device, a communications interface appropriately configured as a transceiver, or the like. The one or more output devices 655 may allow a user of computer system 600 to view objects, icons, text, user interface widgets, or other user interface elements.

A display device or monitor may be used with computer system 600 and can include hardware and/or software elements configured for displaying information. Some examples include familiar display devices, such as a television monitor, a cathode ray tube (CRT), a liquid crystal display (LCD), or the like.

Communications interface 630 can include hardware and/or software elements configured for performing communications operations, including sending and receiving data. Some examples of communications interface 630 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 630 may be coupled to communications network/external bus 680, such as a computer network, to a FireWire bus, a USB hub, or the like. In other embodiments, communications interface 630 may be physically integrated as hardware on a motherboard or daughter board of computer system 600, may be implemented as a software program, or the like, or may be implemented as a combination thereof.

In various embodiments, computer system 600 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 600.

As suggested, FIG. 6 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for creating poses of computer-generated models, the method comprising:
    binding, by a computer system, a first control structure to an object model in a first pose, wherein the first control structure comprises a first plurality of control locations, wherein each control location of the first control structure is bound to at least one location of the object model using a first mapping that determines how a change in position of the control location moves the at least one location of the object model;
    binding, by the computer system, a second control structure to the first control structure, wherein the second control structure comprises one or more control locations, wherein each control location of the second control structure is bound to at least one control location of the first control structure using a second mapping that determines how a change in position of the control location of the second control structure moves position of the at least one control location of the first control structure, the second control structure being separate and distinct from the first control structure;
    receiving, at the computer system, one or more manipulations of a first control location of the second control structure;
    determining, by the computer system, a change in position of a second control location of the first control structure based on the one or more manipulations of the first control location of the second control structure and the second mapping;
    determining, by the computer system, a change in position of one or more locations of the object model based on the change in position of the second control location of the first control structure and the first mapping; and
    generating, by the computer system, a second pose of the object model based on the change in position of the one or more locations of the object model, wherein the first control location of the second control structure is bound to a first subset of the first plurality of the control locations of the first control structure, the first subset including the second control location of the first control structure, wherein the first subset includes multiple control locations.

2. The method of claim 1 wherein binding the second control structure to the first control structure comprises binding a plurality of objects that includes the second control structure to the first control structure using the second mapping, each object in the plurality objects comprising one or more control locations bound to a unique subset of the plurality of locations of the first control structure.

3. The method of claim 1 further comprising binding a third control structure to the first control structure, the third control structure having a first resolution that is different from a second resolution of the second control structure, resolution of a control structure indicative of the number of control locations.

4. The method of claim 1 further comprising binding a third control structure to the first control structure, wherein the third control structure comprises a third plurality of control locations, wherein each control location of the third control structure is bound to at least one location of the first control structure using a third mapping that determines how a change in position of each control location of the third control structure moves position of the at least one location of the first control structure by a first predetermined amount, wherein the second mapping moves bound locations of the first control structure by a second predetermined amount different from the first predetermined amount.

5. The method of claim 1 further comprising:
generating, by the computer system, a graphical user interface comprising a visual representation of the object model, a visual representation of the first control structure, and a visual representation of each object in a plurality of objects that includes the second control structure;
receiving, at the computer system, selection of the second control structure via the graphical user interface; and
receiving, at the computer system, input via the graphical user interface indicative of the one or more manipulations of the second control structure.

6. The method of claim 1 wherein the first control structure comprises one or more of a line object, a surface object, or a volume object.

7. The method of claim 1 wherein the second control structure comprises at least one of a lattice object, a line object, a surface object, or a volume object.

8. The method of claim 1, wherein each control location of the second control structure is associated with a corresponding weight that influences how the change in position of the control location of the second control structure moves position of the at least one control location of the first control structure.

9. The method of claim 8, further comprising:
determining, by the computer system, changes in positions of the control locations in the first subset based on the one or more manipulations of the first control location of the second control structure and the second mapping, and wherein
the determination of the change in position of the one or more locations of the object model is further based on the changes in positions of the control locations in the first subset and the first mapping.

10. The method of claim 8, further comprising:
receiving, at the computer system, one or more manipulations of a second control location of the second control structure, wherein the second control location of the second control structure is bound to a second subset of the first plurality of the control locations of the first control structure, each of the control locations in the second subset being distinct from any control locations in the first subset;
determining, by the computer system, changes in positions of the control locations in the second subset based on the one or more manipulations of the second control location of the second control structure and the second mapping;
determining, by the computer system, a change in position of at least one location of the object model based on the changes in positions of the control locations in the second subset and the first mapping, and wherein
the second pose of the object model is generated further based on the change in position of the at least one location of the object model.

11. The method of claim 1, wherein the first control location of the second control structure is not bound to at least one control location in the first plurality of control locations of the first control structure.

12. The method of claim 1, wherein the manipulation of first control location of the second control structure is along an axis of the second control structure and specifies at least one focal point representing where an extension of a curve is located.

13. The method of claim 12, wherein the manipulation of first control location of the second control structure specifies two focal points representing a shape of a S-curve.

14. A non-transitory computer-readable medium storing program code executable by one or more computer systems for creating poses of computer-generated models, the non-transitory computer-readable medium comprising:
code for binding a first control structure to an object model in a first pose, wherein the first control structure comprises a first plurality of control locations, wherein each control location of the first control structure is bound to at least one location of the object model using a first mapping that determines how a change in position of the control location moves the at least one location of the object model;
code for binding a second control structure to the first control structure, wherein the second control structure comprises a second plurality of control locations, wherein each control location of the second control structure is bound to at least one location of the first control structure using a second mapping that determines how a change in position of the control location of the second control structure moves position of the at least one location of the first control structure, the second control structure being separate and distinct from the first control structure;
code for receiving one or more manipulations of a first control location of the second control structure;
code for determining a change in position of a second control location of the first control structure based on the one or more manipulations of the first control location of the second control structure and the second mapping;
code for determining a change in position of one or more locations of the object model based on the change in position of the second control location of the first control structure and the first mapping; and
code for generating a second pose of the object model based on the change in position of the one or more locations of the object model, wherein the first control location of the second control structure is bound to a first subset of the first plurality of the control locations of the first control structure, the first subset including the second control location of the first control structure, wherein the first subset includes multiple control locations.

15. The non-transitory computer-readable medium of claim 14 wherein the code for binding the second control structure to the first control structure comprises code for binding a plurality of objects that includes the second control structure to the first control structure using the second mapping, each object in the plurality objects comprising one or more control locations bound to a unique subset of the plurality of locations of the first control structure.

16. The non-transitory computer-readable medium of claim 14 further comprising code for binding a third control structure to the first control structure, the third control structure having a first resolution that is different from a second resolution of the second control structure, resolution of a control structure indicative of the number of control locations.

17. The non-transitory computer-readable medium of claim 14 further comprising code for binding a third control structure to the first control structure, wherein the third control structure comprises a third plurality of control locations, wherein each control location of the third control structure is bound to at least one location of the first control structure using a third mapping that determines how a change in position of each control location of the third control structure moves position of the at least one location of the first control structure by a first predetermined amount, wherein the second mapping moves bound locations of the first control structure by a second predetermined amount different from the first predetermined amount.

18. The non-transitory computer-readable medium of claim 14 further comprising: code for generating a graphical user interface comprising a visual representation of the object model, a visual representation of the first control structure, and a visual representation of each object in a plurality of objects that includes the second control structure; code for receiving selection of the second control structure via the graphical user interface; and code for receiving input via the graphical user interface indicative of the one or more manipulations of the second control structure.

19. The non-transitory computer-readable medium of claim 14 wherein the first control structure comprises one or more of a line object, a surface object, or a volume object.

20. The non-transitory computer-readable medium of claim 14 wherein the second control structure comprises at least one of a lattice object, a line object, a surface object, or a volume object.

21. A system for creating poses of computer-generated models, the system comprising:
a processor; and
a memory configured to store a set of instructions which when executed by the processor configure the processor to:

bind a first control structure to an object model in a first pose, wherein the first control structure comprises a first plurality of control locations, wherein each control location of the first control structure is bound to at least one location of the object model using a first mapping that determines how a change in position of the control location moves the at least one location of the object model;
bind a second control structure to the first control structure, wherein the second control structure comprises a second plurality of control locations, wherein each control location of the second control structure is bound to at least one location of the first control structure using a second mapping that determines how a change in position of the control location of the second control structure moves position of the at least one location of the first control structure, the second control structure being separate and distinct from the first control structure;
receive one or more manipulations of a first control location of the second control structure;
determine a change in position of a second control location of the first control structure based on the one or more manipulations of the first control location of the second control structure and the second mapping;
determine a change in position of one or more locations of the object model based on the change in position of the second control location of the first control structure and the first mapping; and
generate a second pose of the object model based on the change in position of the one or more locations of the object model, wherein the first control location of the second control structure is bound to a first subset of the first plurality of the control locations of the first control structure, the first subset including the second control location of the first control structure, wherein the first subset includes multiple control locations.

22. The system of claim 21 wherein the processor is configured to bind the first control structure to the object model based on a static linking between the first control structure and the object model at load time.

23. The system of claim 21 the processor is further configured to bind a plurality of objects that includes the second control structure to the first control structure based on a dynamic linking between each object in the plurality of objects and the first control structure at pose time.

24. The system of claim 21 wherein the processor is further configured to generate a graphical user interface comprising a visual representation of the object model, a visual representation of the first control structure, a visual representation of each object in a plurality of objects that includes the second control structure, and information corresponding to each object in the plurality of objects indicative of how much the object manipulates the first control structure.

* * * * *